(12) United States Patent
Petersen

(10) Patent No.: US 7,762,520 B2
(45) Date of Patent: Jul. 27, 2010

(54) SERVO VALVE FOR A VACUUM SYSTEM

(75) Inventor: Hans Kurt Petersen, Kolding (DK)

(73) Assignee: Danfoss A/S, Nordborg (DK)

( * ) Notice: Subject to any disclaimer, the term of this patent is extended or adjusted under 35 U.S.C. 154(b) by 606 days.

(21) Appl. No.: 10/556,203

(22) PCT Filed: May 24, 2004

(86) PCT No.: PCT/DK2004/000362

§ 371 (c)(1),
(2), (4) Date: Nov. 9, 2005

(87) PCT Pub. No.: WO2004/104463

PCT Pub. Date: Dec. 2, 2004

(65) Prior Publication Data

US 2007/0040134 A1    Feb. 22, 2007

(30) Foreign Application Priority Data

May 26, 2003    (DK) .............................. 2003 00795

(51) Int. Cl.
*F16K 31/12* (2006.01)
(52) U.S. Cl. .................. 251/30.04; 251/30.03; 251/28
(58) Field of Classification Search .................. 251/28, 251/29, 33, 38, 30.01, 30.02, 30.03, 30.04
See application file for complete search history.

(56) References Cited

U.S. PATENT DOCUMENTS

| | | | |
|---|---|---|---|
| 2,413,622 A | 12/1946 | Harding, Jr. ................. 137/139 |
| 3,943,975 A * | 3/1976 | Schnittker .............. 137/630.14 |
| 4,310,142 A * | 1/1982 | Ludwig .................... 251/30.03 |
| 4,783,044 A * | 11/1988 | Ellison .................... 251/30.02 |
| 4,795,131 A | 1/1989 | Scarano et al. ................. 251/63 |
| 2003/0052297 A1 | 3/2003 | Enzaki et al. ................ 251/334 |

FOREIGN PATENT DOCUMENTS

| | | |
|---|---|---|
| DE | 1 077 496 | 3/1960 |
| DE | 33 02 784 C1 | 10/1984 |
| FR | 2 275 715 | 2/1976 |
| GB | 721496 | 1/1955 |
| GB | 2 041 169 A | 9/1980 |
| GB | 2 134 224 A | 8/1984 |

\* cited by examiner

*Primary Examiner*—John K Fristoe, Jr.
(74) *Attorney, Agent, or Firm*—McCormick, Paulding & Huber LLP

(57) ABSTRACT

The invention provides a servo valve which is operable in vacuum systems and can be switched between an open and a closed state even by use of low forces. For that purpose, the valve has a closure member (4) moving between the open and a closed position under influence of a difference between a control pressure of a control chamber (13) and the pressures of the intake (2) and outlet (3), respectively. The control chamber is in constant fluid communication with the intake, and in adjustable fluid communication with the outlet to influence the control pressure mainly by the intake pressure and the outlet pressure depending on the adjustable fluid communication. The invention further provides a vacuum system with such a servo valve.

11 Claims, 6 Drawing Sheets

SERVO VALVE FOR A VACUUM SYSTEM

CROSS REFERENCE TO RELATED APPLICATIONS

This application is entitled to the benefit of and incorporates by reference essential subject matter disclosed in International Patent Application No. PCT/DK2004/000362 filed on May 24, 2004 and Danish Patent Application No. PA 2003 00795 filed May 26, 2003.

FIELD OF THE INVENTION

The present invention relates to a servo valve for opening and closing a passage between a fluid intake and a fluid outlet of a vacuum system and, in particular, the invention relates to a valve which can be inserted in systems with high and low pressure differences and which can be operated with simple actuation means.

BACKGROUND OF THE INVENTION

In general, servo valves for pressure systems exist in which a piston, under influence of a pressure difference between an intake or an outlet port and a control chamber, is movable between a closed and an open position. Due to use of the pressure difference, such valves are operable by way of relatively simple actuators having a low power consumption and weight, e.g. via a solenoid. The actuation may be arranged to move a pilot valve arranged to open or close a fluid passage between one of the ports and the control chamber. For various reasons, the existing valves of this kind are not suitable for vacuum systems, e.g. in connection with leak detection applications. In such systems, it is important to avoid any residual fluid in the valve between each operation thereof. Accordingly, valves and similar components of the system must support complete evacuation and due to a relatively complicated structural layout with various larger and smaller passages connecting the ports with the control chamber, drainage is typically a problem with the traditional servo valves. Moreover, the existing servo valves are made to operate across a certain pre-specified pressure difference. If a valve which is designed for pressure differences in the range of 1-100 bars is inserted across a pressure differential of less than one bar, the pressure difference would normally not be satisfactory for opening the valve, vice versa. Moreover, since the pressure difference disappears shortly after opening the valve, the servo effect of traditional servo valves would disappear. For this reason, traditional servo valves are not useful for vacuum systems.

BRIEF SUMMARY OF THE INVENTION

It is an object of one embodiment of the present invention to provide a valve which is designed for a vacuum system, which can be inserted between pressure differences of less than one bar, and which can still be opened via a servo provided force with the use of moderate forces. Accordingly, the present invention relates to a servo valve for a vacuum system comprising a housing defining a control chamber and a valve passage having a fluid intake part with a first internal pressure and a fluid outlet part with a second internal pressure, the parts being separated by a closure member mounted in the housing for movement between an open and a closed position under influence of differences between an internal pressure of the control chamber and the first and second internal pressures, respectively, the open position being a position wherein the valve passage is open between the two parts and the closed position being a position wherein the valve passage is closed between the two parts, the control chamber being connected to the intake part and to the outlet part so as to enable its internal pressure to be switchably controlled mainly by one of either the first internal pressure or the second internal pressure for switchably controlling movement of the closure member between its closed and its open position, vice versa.

Due to the connection of the control chamber to the intake part and to the outlet part enabling switchable control of the pressure in the control chamber, the valve can be operated by use of the pressure differences without exerting excessive forces.

The closure member may form a pilot passage between the outlet and the control chamber, said pilot passage being closable by a pilot closure member which is movable relative to the closure member between an open position wherein the pilot passage is open and a closed position wherein the pilot passage is closed. When the valve is intended to open, the pilot closure member is moved to its open position, i.e. a position wherein the pilot passage is open. When the pilot passage opens, the control chamber is in fluid communication with the outlet part of the valve passage and the pressure therein between equalizes. Accordingly, a pressure difference which is capable of moving the closure member from the closed to the open position is generated.

When the closure member has moved, the pressure in the intake and outlet parts equalises and, as the outlet part is in fluid communication with the control chamber, the pressure difference between the control chamber and the intake part of the valve passage disappears. Since this pressure difference has been utilized to keep the closure member in its open position, the closure member could, depending upon the orientation of the valve and the flow speed of the fluid flowing there through, move back to its closed position. In order to avoid this, the valve may have a pilot closure member which is movably fastened to the closure member via an elastically deformable coupling, e.g. via a resilient rubber band, a spring such as a helical spring or via similar arrangement capable of being stretched elastically. In particular, a spring with a spring constant in the range of 0.5-1.5 N/mm. e.g. 1 N/mm. is suitable for a valve used in a vacuum system. The spring may be pre-tensioned to approximately 3 N, i.e. approximately 3 mm.

In order to provide the valve with a "normally closed" characteristic, the closure member could be biased against the closed position by an elastically compressible member, e.g. a flexible rubber rod or a helical spring etc.

Preferably, the pilot closure member, and thus the opening and closing of the valve is operated electromagnetically, or alternatively, pneumatically, hydraulically or simply manually via a push or pull button. In any case, in order to reduce the force which is necessary to open the valve, it is an advantage to form the pilot passage with a smaller cross-sectional area than the opening of the valve passage, e.g. with an area in the size of 5-20 times smaller than the area of the valve passage.

In some applications, e.g. in connection with use of the valve in a vacuum system for leak detection, it is an object to ensure that all residuals of the fluid is evacuated from the valve between each opening and closing sequence. For that purpose, the control chamber may advantageously be arranged in continuation of the passage from the fluid outlet to the closure member and preferably, so that the chamber and at least the outlet part of the valve passage is coaxially arranged.

In fact, the outlet part of the valve passage and the control chamber may be formed as one longitudinally extending bore within the housing.

The sealing member could be formed as a ball valve or as a piston arranged to move back and fourth in a cylindrical cavity of the housing. The piston and cylindrical cavity may have any matching cross-sectional shapes. However, in order to support the manufacturing of the valve, it is an advantage to provide the parts with circular cross-sectional shapes allowing the cavity to be formed as a bore hole.

In order to improve the sensitivity of the valve, it is an object both to keep the weight of the piston low. Accordingly, the piston may be shaped with three main parts, namely a lower sealing flange connected upwardly to a cup-shaped part by an elongate shank, the cup-shaped part forming a bottom wall and a sidewall extending from the bottom wall upwardly towards an opening in a direction opposite the direction towards the sealing flange. The pilot passage can be formed inside the shank of the piston and the sealing flange, the cup-shaped part and the elongate shank can be formed coaxially.

In order to ensure a more reliable valve wherein the piston moves smoothly without tilting during its back and fourth movement within the cylindrical cavity of the housing, the piston may be formed so that it has its centre of gravity along the centre axis of the piston at a position between the bottom wall and the opening of the cup-shaped part. The above described specific cup- and shank shaped piston with its centre of gravity in the area of the cup-shaped part enables use of the valve in very low vacuum, e.g. in pressures in the range of $1*10^{-3}$-$1*10^{-6}$ mBar.

During opening of the valve, the pilot closure member is lifted from its closed position by moving the pilot closure member in a direction away from the piston, causing the pilot passage to open. The resulting pressure difference between the control chamber and the intake part of the valve passage causes the piston to move upwardly and to open the valve passage. During this movement, the piston again comes closer to the pilot closure member. In order to avoid that the pilot passage closes when the piston moves towards the pilot closure member, the maximum possible travel of the pilot closure member may advantageously be larger than the corresponding maximum possible travel of the piston. To read the position of the closure member and/or the position of the pilot closure member, the valve may have one or more magnets incorporated in one of the housing or in the closure members and corresponding magnetic sensors, e.g. reed switches, in the opposite one of the housing or closure members. If the magnet are of the type made by sintering, the somewhat porous structure could be sealed by a coating, e.g. comprising zinc or a sandwich of layers e.g. zinc-copper-zinc or any similarly tightly sealing compositions. The sealing of the porous structure is done to avoid contamination of the magnet with oil, moisture or gasses.

The sealing flange of the piston may comprise a sealing ring made from a resilient material, e.g. flour rubber (FPM—from DuPont, c.f. www.dupont.com) and arranged between two sidewalls of a recess in the flange. In order to improve evacuation of the valve, the walls may comprise at least one notch formed in both of the walls across the recess and, optionally, also in a bottom wall of the recess. During evacuation, the fluid can be forced out of the valve via the notch.

The valve may further comprise at least one piston ring, e.g. made from polyetheretherketone (PEEK). The piston ring serves to guide the piston in the cylindrical cavity. In order to allow the pressure difference between the intake part of the valve passage and the control chamber to be equalized when the pilot closure member is in its closed position and thereby to allow the valve to close, the piston ring may be shaped to form at least one ventilating passage between the intake part of the valve passage and the control chamber. The passage could be formed in the piston ring or between the wall of the cylindrical cavity and the piston ring or between a sidewall of the piston and the piston ring. As an alternative or in addition to the passage formed between the piston ring and the housing or piston, respectively, one or more passages may be provided between the control chamber and the intake part of the valve passage, e.g. in the form of bore holes in the walls of the housing.

In order to secure the piston ring(s) against sliding on the piston, the ring(s) could be arranged between two sidewalls of a recess formed in a peripherally outer surface of the cup-shaped part of the piston. In order to allow a better evacuation of the valve, the walls of the recess could be made at least one notch formed in both of the walls and, across the recess. In order to allow fluid to pass behind the piston ring(s), i.e. between the piston and the ring, a bottom wall of the recess could also be formed with a notch allowing fluid to pass into one notch in one of the sidewalls of the recess, down into the notch of the bottom wall of the recess and out through the notch formed in the other sidewall of the recess. In order to improve evacuation further, the recess or recesses could have a plurality of notches.

In a second aspect, the invention relates to a vacuum system comprising a servo valve of the previously described kind.

BRIEF DESCRIPTION OF THE DRAWINGS

In the following, a preferred embodiment of the present invention will be described in further details with reference to the drawing in which.

DETAILED DESCRIPTION OF THE INVENTION

Figure 1:
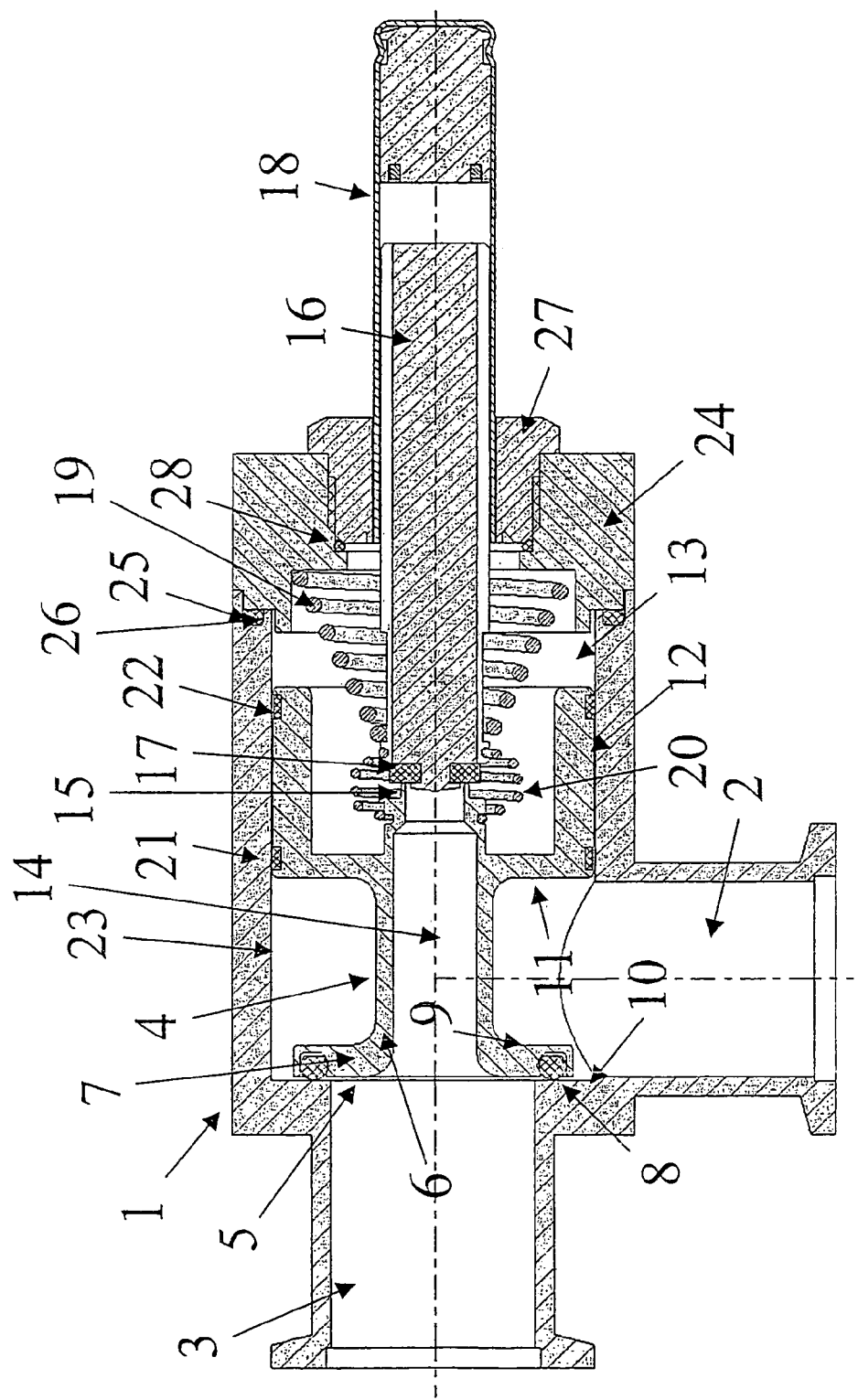
FIG. 1 shows a cross-sectional view of a valve according to the invention.
Figure 3:
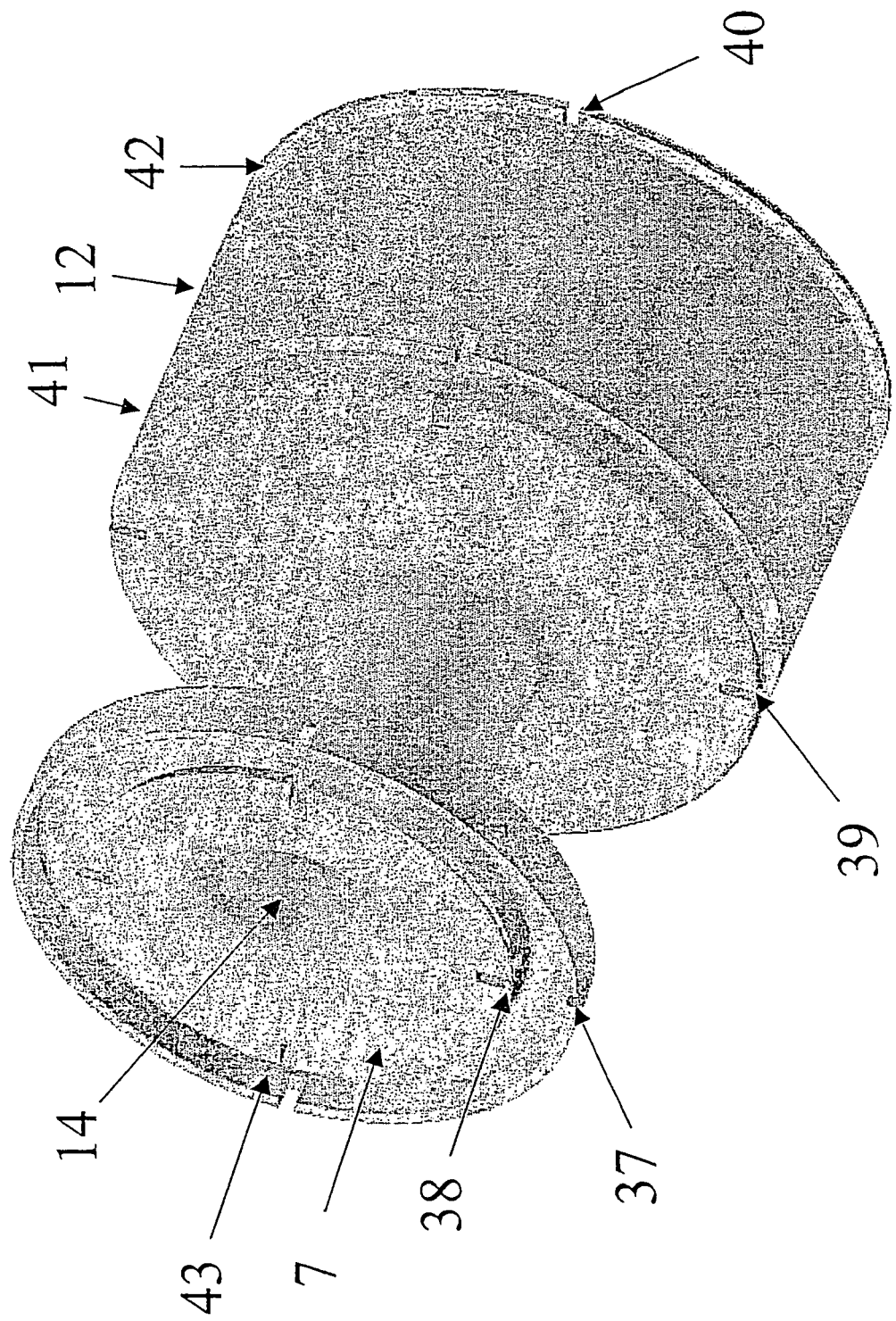
FIG. 3 shows a 3-D view of a closure member for the valve according to the invention.

The valve shown in FIG. 1 has a housing 1 forming a valve passage having an intake part 2 and an outlet part 3 separated by a closure member 4. The closure member has the shape of a piston forming a circular sealing surface 5 on a bottom surface of a closure flange 7 of the piston. The sealing surface holds a lib-profiled (see also FIG. 5) or an O-profiled ring (an O-ring) 8 made of a resilient material, e.g. rubber. The closure flange has an opposite upper surface 9 facing towards the intake part of the valve. The valve is shown with the piston in its closed position wherein the sealing surface is lowered to a position wherein the O-ring seals against the seat 10 of the housing. At its opposite end, the piston is cup-shaped with a bottom wall 11 and an upwardly extending sidewall 12 bounding a control chamber 13 formed in the housing in extension to the low pressure part of the valve passage. The piston forms a pilot passage 14 extending from the low pressure part of the valve passage to the control chamber through a shank part 6 of the piston, the pilot passage terminating upwardly in a pilot valve seat being closable by way of a pilot closure member 16. In the disclosed embodiment, the pilot closure member is made in the form of a rod shaped elongate anchor with a resilient rubber gasket 17 which serves to tighten the pilot closure member sealingly against the pilot seat 15. The pilot closure member is allowed to slide in the anchor tube 18 and can be lifted off the pilot seat 15 under influence e.g. of a solenoid (not shown). The pilot closure member is biased towards the piston which is thereby biased against its closed position under influence of the force from the helical spring 19. The helical spring 20 couples the closure member to the pilot closure member and the piston rings 21, 22 serves both to guide the piston along the inner sidewall 23 of the housing and to form outer passages between the control chamber and the high pressure part of the valve passage. The outer passages are formed between the inner sidewall 23 of the housing and the sidewall 12 of the piston. A cover 24, forming a top wall of the control chamber, is attached to the housing. A resilient O-ring 25 is arranged in a grove 26 between the cover and the housing. The anchor tube 18 is fastened to the cover via the plug 27 and the resilient O-ring 28 secures a fluid tight sealing. Alternatively, the anchor tube and the cover or even the housing is made in one piece, e.g. by a moulding process. In order to keep the weight low, the cup shaped piston, which is shown in further details in FIG. 3, is moulded with a relatively low wall thickness and in a light weight material. The geometry of the piston is chosen so that the centre of gravity is above the inlet from the intake part to the control chamber. The relatively slim shank part of the piston is chosen to reduce the weight.

During an opening operation of the valve, the solenoid is activated, e.g. with a 220 V start-up voltage until the pilot closure member is released from the pilot seat. At this point the voltage applied to the solenoid may typically be lowered, e.g. by chopping up the applied current into smaller bits with a certain chopping frequency or, simply by reducing the applied voltage e.g. to the size of 110V in average. When the pilot closure member is released from the seat, vacuum in the outlet part of the valve passage evacuates the control chamber and an upwardly directed force caused by the pressure differential between the pressure in the intake part of the valve passage and the pressure in the control chamber and outlet part, respectively, starts to build up. The relatively high pressure in the intake part acts both on the lower surface of the bottom wall 11 of the cup shaped part of the piston and on the upper surface of the closure flange 7. The same applies to the relatively low pressure in the outlet part and in the control chamber acting in opposite directions on the lower surface of the closure flange 7 and the upper surface of the bottom wall 7, respectively. However, due to the different sizes, of the down and upwardly directed surface, the resulting force moves the piston upwardly from its closed position to its open position. When the piston moves to its open position, the pressure in the low and high pressure parts of the valve passage equalizes, and via the outer passages and the pilot passage, the pressure in the control chamber is also equalised with the pressure of the valve passage. As a result, the upwardly extending force caused by the pressure difference terminates. At this point, the piston is held in its open position by the coupling between the pilot closure member and the piston, i.e. by the helical spring 20.

Figure 2:
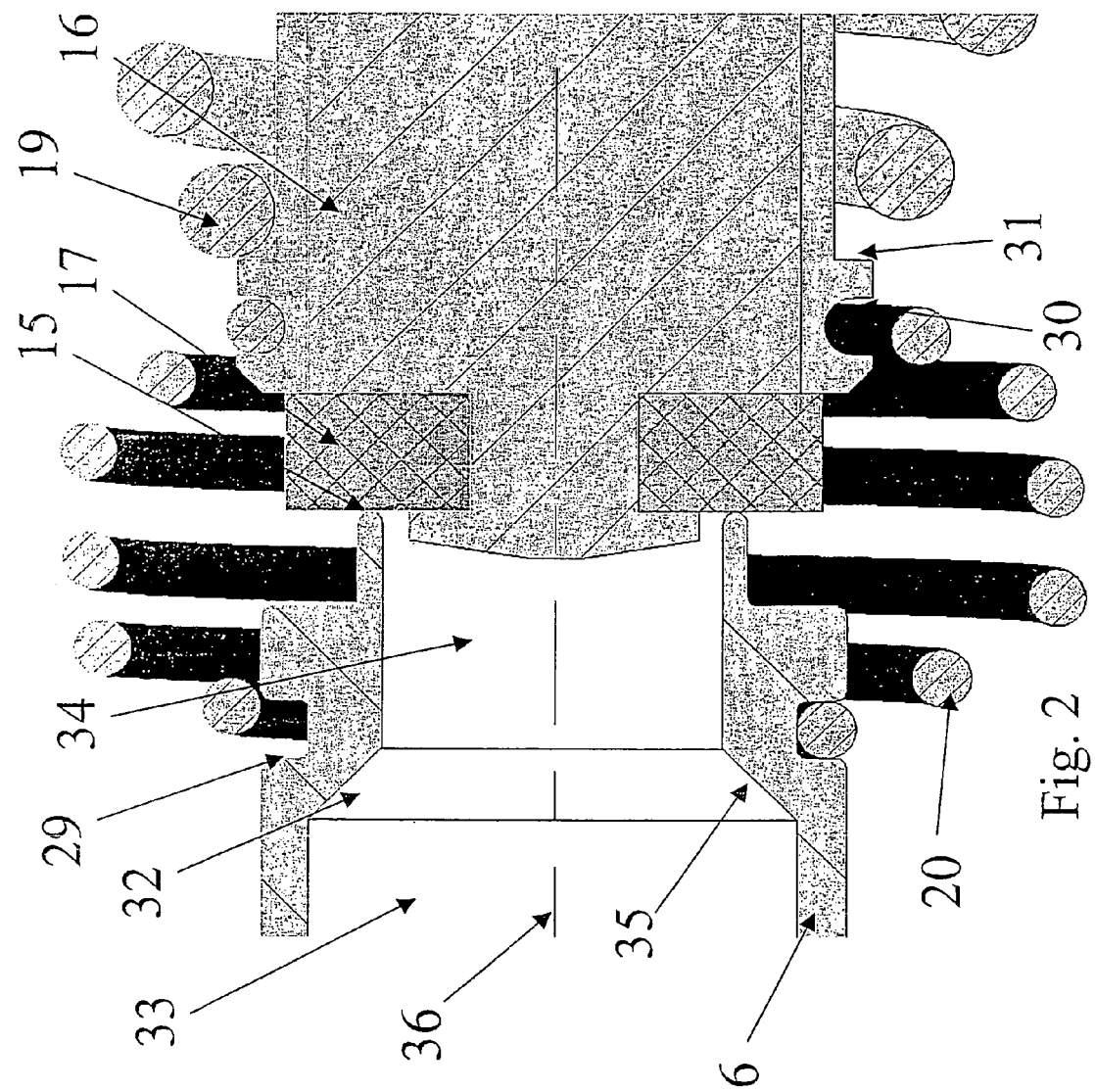
FIG. 2 shows a detailed view of a coupling between the pilot closure member and the closure member.

FIG. 2 shows an enlarged view of the coupling between the pilot closure member and the closure member of FIG. 1, including the numerals of FIG. 1. In the enlarged view, it is clearly seen, that the coupling spring 20 is fastened fixedly both to the pilot closure member 16 and to the piston 6 by way of locking a first and a last winding into grooves 29, 30 of the piston and pilot closure member, respectively. The helical spring 19, which is arranged to bias the pilot closure member against the piston and thereby to bias the piston against its closed position, presses against the radial outwardly extending flange 31 of the pilot closure member. The pilot passage 14 is constricted upwardly and the transition 32 between wider part 33 and the narrow part 34 of the passage is bevelled with a surface 35 forming an angle of approx. 45 degrees to the centre axis 36 of the piston and passage.

In FIG. 3, the piston 6 of FIG. 1 is shown in a 3-D view. The lower recess 41 and the upper recess 42 formed in the sidewall 12 of the cup-shaped part of the piston serves to hold the piston rings (numeral 21, 22 in FIG. 1) in place. The notches 39, 40 formed across the recess, i.e. in both sidewalls and in the bottom wall of the recess, serves to enhance the ability of valve to be evacuated completely between each opening and closing sequence of the valve. The recess 43 formed in the circular closure flange 7 serves to hold an O-ring or a lib-profiled ring of a resilient material for sealing against the seat 10. Also, the notches 37, 38 made in the sidewalls and optionally in the bottom wall of the recess and facing each other across the recess, serve to enhance the ability of the valve to be emptied completely between each opening and closing sequence. In FIG. 3, it is clearly seen that the opening of the pilot passage 14 has smoothly rounded corners which enhance the flow and the ability to empty the valve between each operation.

Figure 4:
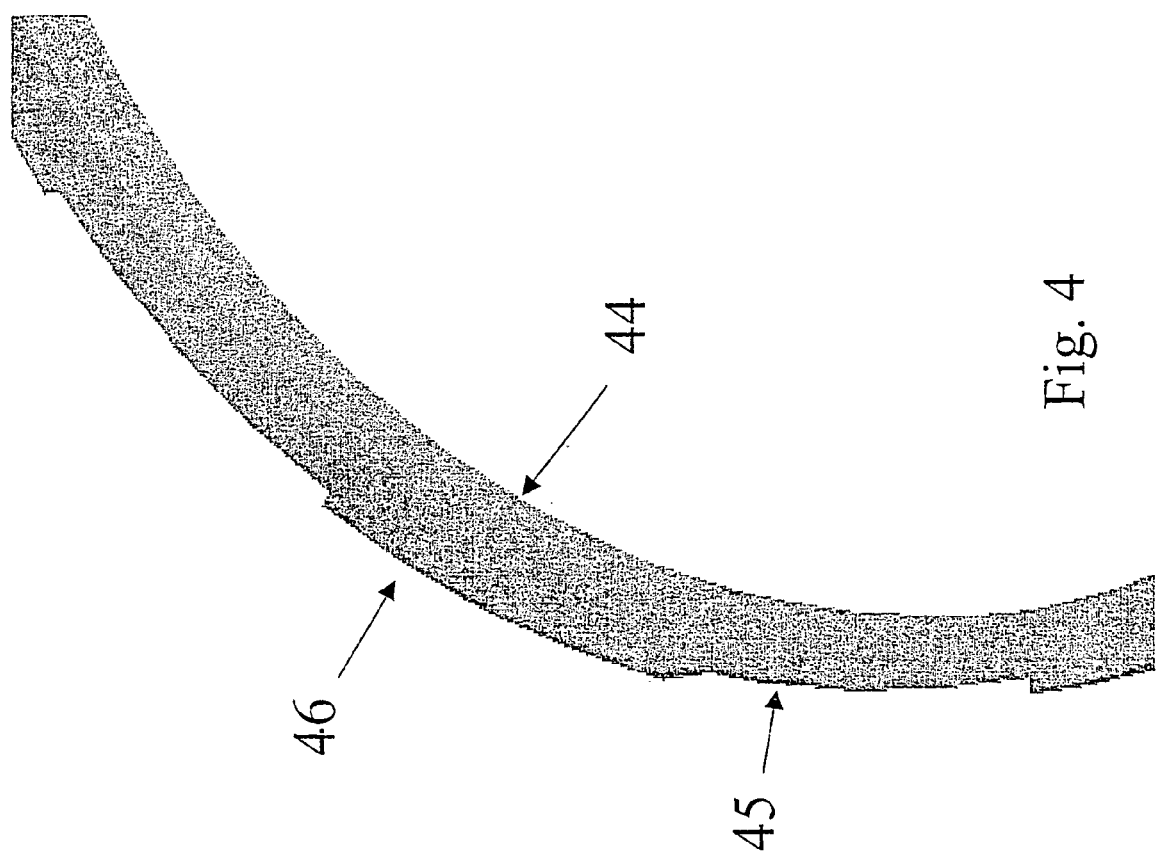
FIG. 4 shows a detailed view of a piston ring forming ventilating passages between the high pressure part of the valve passage and the control chamber.

The piston ring is shown in FIG. 4. The ring has an inner surface 44 facing towards the piston and an outer surface 45, 46 facing towards the wall of the cylindrical cavity of the housing. Due to the stepped outer surface, ventilating passages are formed between the wall and the parts of the peripheral surface of the ring wherein the radial size is smallest, i.e. the surface 45 in FIG. 4.

Figure 5:
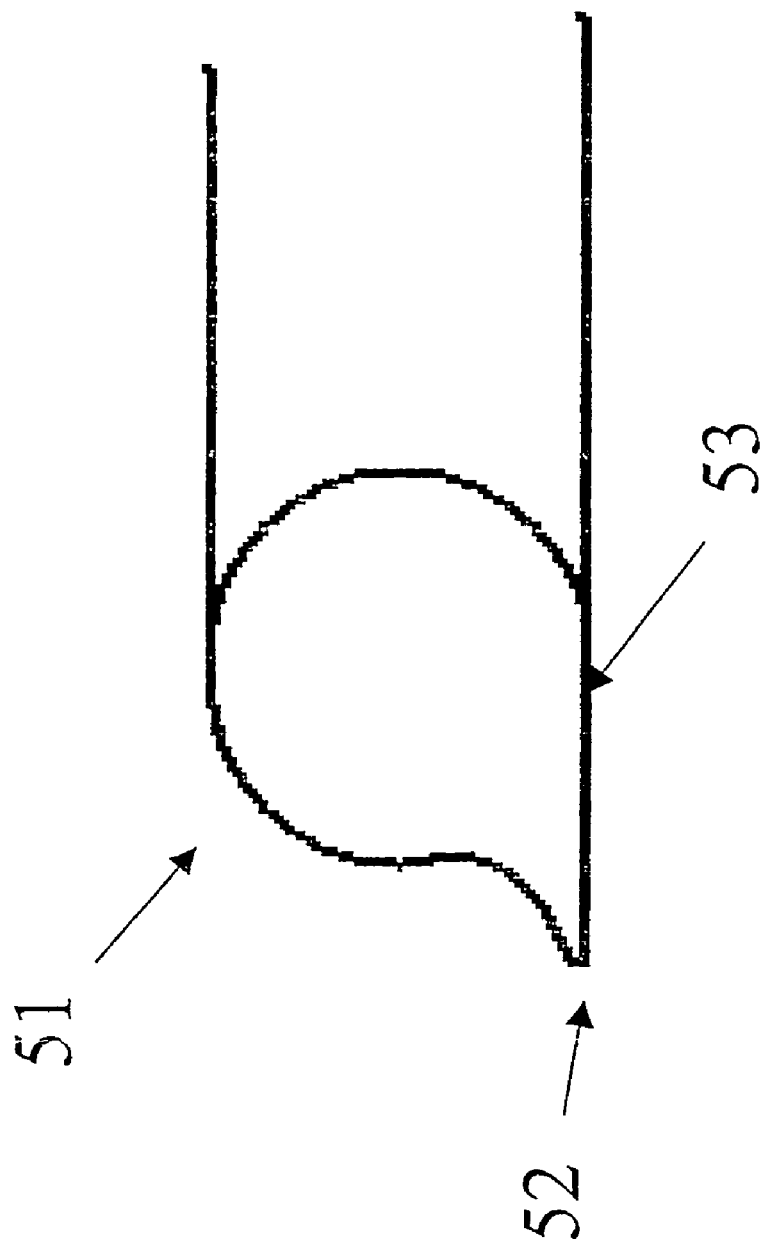
FIG. 5 shows a sealing ring having, in a cross-sectional view, a lib-profile.

In FIG. 5, a cross sectional view of a sealing ring 51 of a resilient material for the recess 43 is shown. The ring has a lib-profiled shape.

Figure 6:
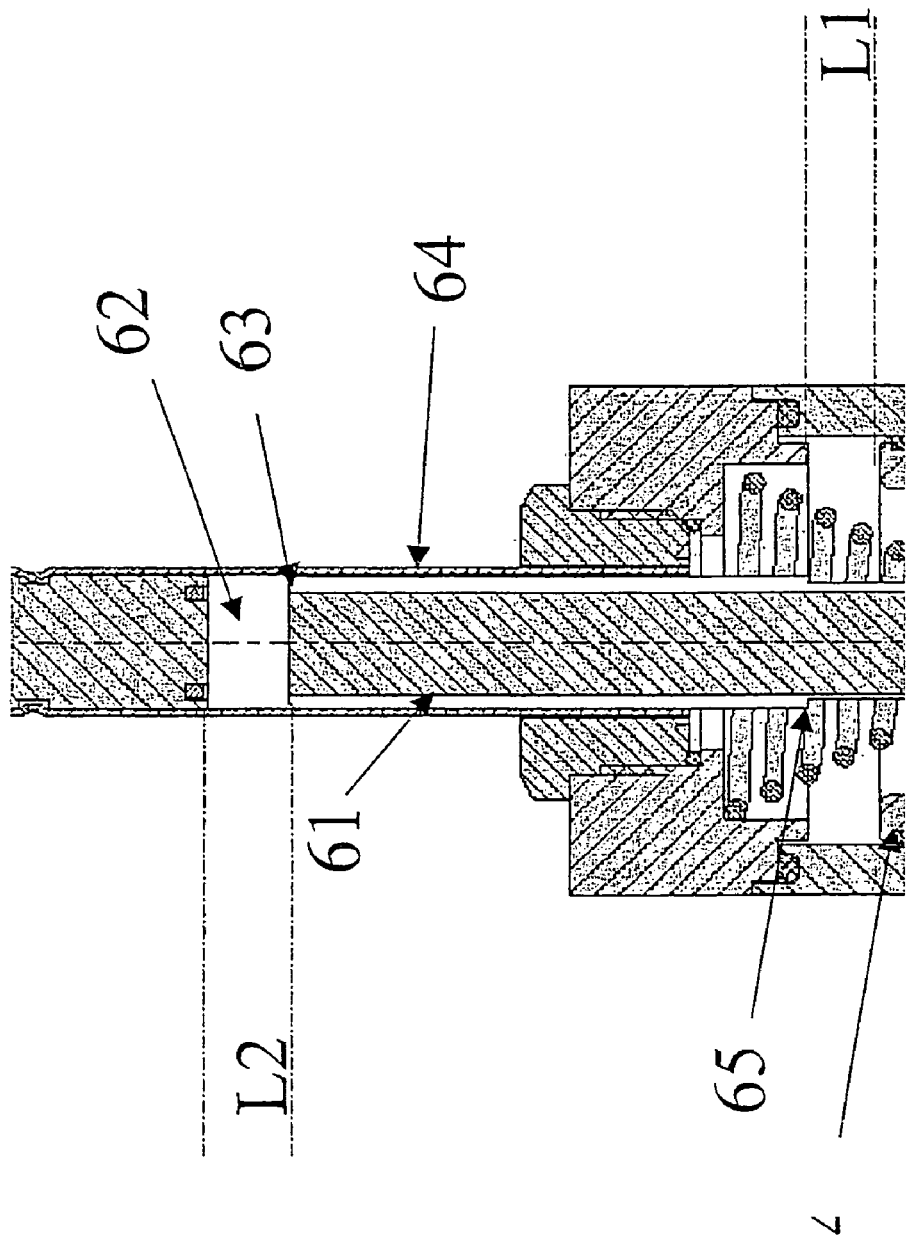
FIG. 6 shows an enlarged view of the anchor and anchor tube.

FIG. 6 shows an enlarged view of the anchor and anchor tube of the valve disclosed in FIG. 1. The longitudinally extending groove or grooves 61 in the anchor serve to evacuate the space 62 bound by the top surface 63 of the anchor and the anchor tube 64. The grooves terminate at a point 65 in the control chamber. The valve is dimensioned so that the maximum possible travel L2 of the anchor is larger than the maximum possible travel L1 of the closure member 4. Accordingly, the pilot passage will remain open during the opening of the valve, even when the closure member is in its maximal open position. This feature improves the flow out of the valve and thus supports fast and complete evacuation of the valve.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A servo valve for a vacuum system comprising:
   a housing defining a control chamber and a valve passage having a fluid intake part with a first pressure and a fluid outlet part with a second pressure, the parts being separated by a closure member mounted in the housing for movement between an open and a closed position under influence of a difference between a control pressure of the control chamber and the first and second pressures, the open position being a position wherein the valve passage is open between the intake part and the outlet part and the closed position being a position wherein the valve passage is closed between the intake part and the outlet part, the control chamber being in fluid communication with the intake part via a constantly open passage and being in controllable fluid communication with the outlet part via a pilot passage, being closable by a pilot closure member which is movable relative to the closure member between an open position wherein the pilot passage is open and a closed position wherein the pilot passage is closed to influence the control pressure mainly by one of the first pressure and the second pressure depending on the position of the pilot closure member, and thereby for controlling movement of the closure member between its closed and its open position, the pilot closure member being fastened to the closure member via an elastically deformable coupling, wherein the pilot closure member is biased towards its closed position by an elastically compressible member acting between the housing and the pilot closure member; and wherein the closure member is shaped as a piston and arranged to move back and fourth in a cylindrical cavity of the housing; and wherein the closure member and the cylindrical cavity have circular cross-sectional matching shapes, and wherein the constantly open passage is formed between a sidewall of the closure member and an inner sidewall of the cylindrical cavity.

2. The servo valve according to claim 1, wherein the pilot passage is formed in the closure member.

3. The servo valve according to claim 2, wherein the pilot closure member is movable from its closed position to its open position via electromagnetic actuation.

4. The servo valve according to claim 2, wherein the pilot passage forms a smaller cross-sectional opening than the valve passage.

5. The servo valve according to claim 2, wherein the control chamber is located in continuation of the pilot passage.

6. The servo valve according to claim 1, wherein the closure member is biased towards the closed position by the elastically compressible member.

7. The servo valve according to claim 1, wherein closure member is shaped and arranged with respect to the housing so that its centre of gravity is defined between valve passage and the control chamber.

8. The servo valve according to claim 1, wherein the pilot passage is formed coaxially with the closure member.

9. The servo valve according to claim 1, wherein the closure member comprises at least one recess comprising at least one notch formed across the recess.

10. A servo valve for a vacuum system comprising:

a housing defining a control chamber and a valve passage having a fluid intake part with a first pressure and a fluid outlet part with a second pressure, the parts being separated by a closure member mounted in the housing for movement between an open and a closed position under influence of a difference between a control pressure of the control chamber and the first and second pressures, the open position being a position wherein the valve passage is open between the intake part and the outlet part and the closed position being a position wherein the valve passage is closed between the intake part and the outlet part, the control chamber being in fluid communication with the intake part via a constantly open passage and being in controllable fluid communication with the outlet part via a pilot passage, being closable by a pilot closure member which is movable relative to the closure member between an open position wherein the pilot passage is open and a closed position wherein the pilot passage is closed to influence the control pressure mainly by one of the first pressure and the second pressure depending on the position of the pilot closure member, and thereby for controlling movement of the closure member between its closed and its open position, the pilot closure member being fastened to the closure member via an elastically deformable coupling, wherein the pilot closure member is biased towards its closed position by an elastically compressible member acting between the housing and the pilot closure member; and wherein the closure member is shaped as a piston and arranged to move back and fourth in a cylindrical cavity of the housing; and wherein the pilot closure member is arranged to move back and fourth in a cylindrical cavity with a travel which is larger than the travel of the closure member.

11. A servo valve for a vacuum system comprising:

a housing defining a control chamber and a valve passage having a fluid intake part with a first pressure and a fluid outlet part with a second pressure, the parts being separated by a closure member mounted in the housing for movement between an open and a closed position under influence of a difference between a control pressure of the control chamber and the first and second pressures, the open position being a position wherein the valve passage is open between the intake part and the outlet part and the closed position being a position wherein the valve passage is closed between the intake part and the outlet part, the control chamber being in fluid communication with the intake part via a constantly open passage and being in controllable fluid communication with the outlet part via a pilot passage, being closable by a pilot closure member which is movable relative to the closure member between an open position wherein the pilot passage is open and a closed position wherein the pilot passage is closed to influence the control pressure mainly by one of the first pressure and the second pressure depending on the position of the pilot closure member, and thereby for controlling movement of the closure member between its closed and its open position, the pilot closure member being fastened to the closure member via an elastically deformable coupling, wherein the pilot closure member is biased towards its closed position by an elastically compressible member acting between the housing and the pilot closure member; and wherein the closure member is shaped as a piston and arranged to move back and fourth in a cylindrical cavity of the housing; and wherein the closure member forms a sealing flange for closing the valve passage, the sealing flange being connected by an elongate shank to a cup-shaped part, the cup-shaped part forming a bottom wall and a sidewall extending from the bottom wall towards an opening in a direction opposite the direction towards the sealing flange, and the cup-shaped part and the elongate shank being formed coaxially.

* * * * *